United States Patent [19]

Buchas

[11] Patent Number: 4,660,031
[45] Date of Patent: Apr. 21, 1987

[54] SYSTEM FOR DISPLAYING ALPHANUMERIC MESSAGES

[75] Inventor: Gerald L. Buchas, Bristol, Conn.

[73] Assignee: The Arthur G. Russell Company, Incorporated, Bristol, Conn.

[21] Appl. No.: 520,630

[22] Filed: Aug. 5, 1983

[51] Int. Cl.[4] ............................................. G09G 3/20
[52] U.S. Cl. .................. 340/792; 340/726; 340/756
[58] Field of Search .............. 340/750, 721, 726, 724, 340/725, 748, 749, 792

[56] References Cited

U.S. PATENT DOCUMENTS

| | | | |
|---|---|---|---|
| 3,868,675 | 2/1975 | Firmin | 340/792 |
| 4,359,730 | 11/1982 | Kunikane et al. | 340/792 |
| 4,373,192 | 2/1983 | Yanagiuchi et al. | 340/792 |
| 4,381,505 | 4/1983 | Dion | 340/756 |
| 4,467,323 | 8/1984 | Kling et al. | 340/721 |
| 4,510,491 | 4/1985 | Prato | 340/792 |
| 4,609,919 | 9/1986 | Miyazaki et al. | 340/792 |

FOREIGN PATENT DOCUMENTS 0116133  9/1980  Japan ................... 340/721

*Primary Examiner*—Gerald L. Brigance
*Assistant Examiner*—Jeffery Brier
*Attorney, Agent, or Firm*—McCormick, Paulding and Huber

[57] ABSTRACT

A system for displaying alphanumeric messages includes a unitary visual display device having a limited number of character display stations at each of which a character may be created in response to a set of signals applied to the character station. A memory stores a plurality of complete message units which form a number of complete messages and some of the complete messages are multiple-message unit messages made up of a number of complete message units in a sequence. The message units in a multiple-message unit message are automatically accessed from memory and displayed in a time-spaced relationship by the display device one complete message unit at a time. The memory may also store complete message units having a stored message component and a real time message component. A predetermined number of character stations are automatically reserved to display real time characters in a complete message unit having a stored and real time message component.

15 Claims, 3 Drawing Figures

SYSTEM FOR DISPLAYING ALPHANUMERIC MESSAGES

BACKGROUND OF THE INVENTION

This invention relates to a system for displaying alphanumeric messages by means of a unitary visual display device and deals more particularly with apparatus for expanding the message display capacity of such a device.

Multiple character station unitary visual display devices used in display systems are generally well known in the art. Such multiple character display devices generally have a fixed number of character stations which limit the number of characters in the displayed message to the number of character display stations of the device. One such display system employing a limited capacity multiple character station device is illustrated and described in U.S. Pat. No. 4,381,505 assigned to the assignee of the present invention.

Although the aforementioned display system has numerous applications, it is often found in industrial applications utilizing an automatic controller or monitoring device for a manufacturing, material handling, chemical or other industrial process. In such uses the controller may operate to select a message unit from a memory in accordance with different conditions monitored by the controller which when displayed advises an operator of a monitored condition, provides a warning, gives an instruction or the like, or the controller may also select a stored message component from the memory to which is added real time data representing the value of real time variables or other associated real time conditions.

Often it is necessary to display a message unit exceeding the number of character stations of the display device or to display a sequence of message units to provide additional information or instructions to an operator. A limitation in displaying multiple-message unit messages in a unitary visual display device system is generally the expense and complexity associated with the additional equipment such as memory modules and software programming in the controller operating with such a display system.

Another drawback often associated with the above described display systems is the additional equipment required in the controller to convert binary coded decimal (BCD) signals representative of a message unit address to binary coded signals to select messages from the display system memory. Since the real time data is represented in BCD signal format, separate multiconductor lines for message selection signals and real time data signals are required to connect the associated controller outputs to separate BCD and binary input ports in the display system.

Still another limitation is the additional controller equipment and associated software required to provide a reserve signal to the display system to reserve character locations in the visual display device to display real time data associated with a stored message component having a real time message component.

Accordingly, it is desirable to have a unitary visual display system for use with controllers or the like capable of displaying multiple-message unit messages wherein the message units may be made up of entirely stored message units or message units having both stored and real time components and that avoids the drawbacks of the aforedescribed display systems.

The general aim of the present invention is to provide an improved alphanumeric unitary visual display system having an expanded message display capability that overcomes the limitations of previously used unitary visual display systems. The unitary visual display system of the present invention provides multiple-message unit message display capability and real time data reserve signals without the complex hardware, software, and wiring generally required in controllers used with prior display systems.

Other objects and advantages of the invention will be apparent from the following written detailed description and from the accompanying drawings.

SUMMARY OF THE INVENTION

The invention resides in a circuit for sequencing complete message units in a sequence of complete message units to present a complex message. A unitary visual display device having a number of character stations at each of which any one of a multiple of characters may be displayed by the application thereto of a set of signals is used to display the complete message units. The complete message units are stored in a memory and are made up of a plurality of characters not greater in number than the number of character stations of the display device and each character has a binary coded signal representative of the character to be displayed. Some of the message units are comprised of stored message components and real time message components with the stored message components having a plurality of characters smaller in number than the number of character stations of the display device. A real time signal means associated with a plurality of real time conditions provides a selection of real time message components. A complete message comprises a single complete message unit or a number of complete message units in sequence.

The invention more specifically resides in a first signal means to indicate the first message unit in a complete message and a first sensing means to detect the presence of the first signal means in a first predetermined character location in memory. A sequencing activation circuit means is responsive to the detection of the first signal means and enables a complete message unit sequencing means circuit so that each message unit of a complete message is automatically accessed and selected from the memory means and displayed by the visual display device in a time-spaced relationship one complete message unit at a time.

The invention further resides in a second signal means to indicate the last message unit in a complete message and a second sensing means to detect the presence of the second signal means in a second predetermined character location in memory to deactivate the sequencing circuit means.

The invention also resides in a reserve digit signal means to indicate that a complete message unit is a combination message unit and includes a stored message component and a real time message component. A third sensing means detects the presence of the reserve digit signal means in a third predetermined character location in memory. A reserve character select logic circuit means responsive to the third sensing means reserves a number of character display stations of to display at the reserved stations a corresponding number of characters comprising the real time message component.

DETAILED DESCRIPTION

A representative system for displaying alphanumeric messages by means of a unitary visual display device having a limited number of character stations and capable of embodying the present invention is manufactured by The Arthur G. Russell Company, Incorporated, of Bristol, Conn. Briefly, the system has a display device with a row of character stations at each of which a character may be created for display in response to a set of signals applied to the character station. A memory device stores a plurality of message units, some of which are complete message units and others of which are stored message components. The message units selected by a real time means are converted by a control circuit into a set of signals which are applied in a one to one relationship to the character stations of the display device to cause the display of a single complete message unit. The display system is illustrated and described in U.S. Pat. No. 4,381,505, issued Apr. 26, 1983 and assigned to the assignee of the present invention.

Figure 1:
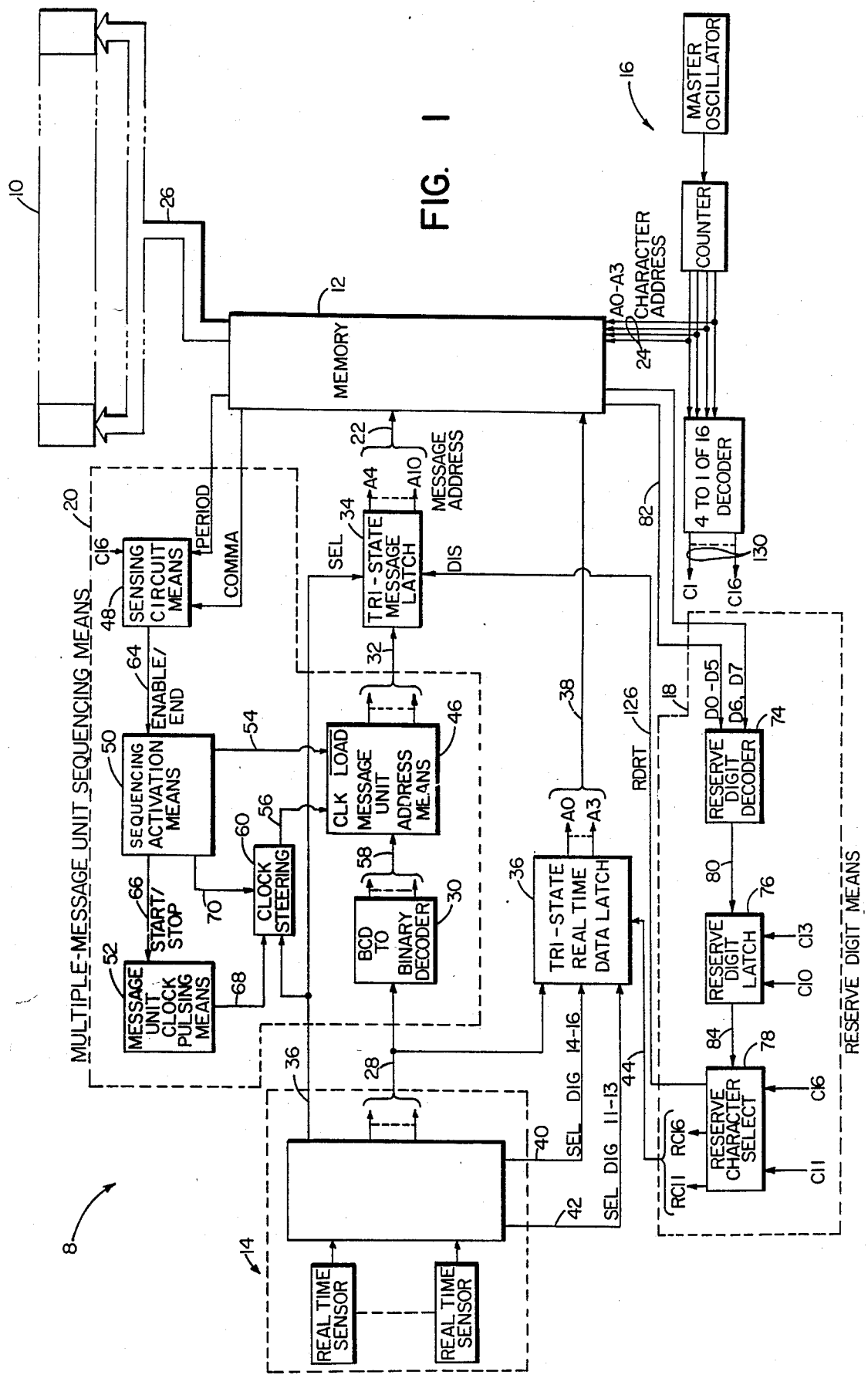
FIG. 1 shows in block diagram form an alphanumeric display system embodying the present invention.

Turning now to the invention of the present disclosure, FIG. 1 shows in block diagram form, an alphanumeric unitary visual display system designated generally by the numeral 8 embodying the invention. The display system comprises a multi-character station unitary visual display device 10, a memory means 12 which stores a variety of message units, a real time signal means shown generally at 14 providing a selection of real time message components, a master clock means 16, a reserve digit real time signal means 18 for reserving a plurality of character stations to display a real time message component and a multiple-message unit sequencing means 20.

The memory means 12 may take various forms such as a programmable-read-only-memory (PROM) or an eraseable-programmable-read-only-memory (EPROM) and stores a number of message units each assigned a number of character storage locations in the memory equal in number to the number of character display stations of the display device 10 which in the preferred embodiment is 16. A stored message unit as described below is selected from memory 12 by a binary coded message address signal applied to the address terminals A4–A10 via a multiple conductor address line 22. The individual character locations of a selected message unit are in turn selected by a character address signal supplied by a four conductor character address line 24 connected to four corresponding address terminals A0–A3 of the memory 12. The information stored at the character location so selected is read out of memory 12 in the form of a nineteen bit binary coded signal onto a character bus 26.

A more detailed explanation of the display device and alphanumeric character signal generation may be had by referring to the aforementioned U.S. patent which is hereby adopted by reference into the present disclosure.

A complete message as used in this disclosure is one made up of one or a plurality of complete message units.

A complete message unit may be entirely stored in memory or may be made up of a stored message component and a real time message component provided by a real time signal means. When the complete message unit is entirely stored in memory, display information is contained at all sixteen of their character locations in the memory 12. When the complete message unit includes a stored message component, display information is contained at less than all of their sixteen character locations in memory. The length of a stored message component may vary in different embodiments but in the embodiment of FIG. 1 it may be either thirteen characters long or ten characters long. More specifically, for each stored message component either three or six of the display stations of the display 10 may be reserved for the character display of real time information and when such stations are reserved, no meaningful information is stored in the corresponding character locations of the memory. Such reservation is indicated by a predetermined coded reserve signal and is explained in further detail below.

The real time signal means 14 functions to select the message to be displayed by the display device 10. This is done by outputting a message unit address signal on the multiple conductor line 28 connecting the real time signal means 14 to the sequencing means 20 of the display system 8. The message address signal is in turn outputted from the sequencing means 20 on the multiple conductor line 32 to a tri-state buffer message latch 34. The selected message unit address signal is outputted onto the message address line 22 to access a complete stored message unit or a stored message component in the memory 12 when the latch 34 is enabled by a message select signal on line 35.

When the real time signal means 14 selects a stored message component that requires real time information to form a complete message unit, a read real time (RDRT) signal disables the tri-state message latch 34 so that real time data appearing on the multiple conductor line 28 is fed to a tri-state buffer real time data latch 36. This real time data is transferred to address terminals A0–A3 of the memory 12 by means of a multiple conductor line 38. Real time data appearing in character locations 14–16 and 11–13 is transferred to the memory 12 and in turn to the character bus 26 one character location at a time as the corresponding select digit signal on lines 40,42 strobe the tristate buffer 36 when a corresponding reserve character select enable signal RC11–RC16 is present on the multiple conductor lead 44.

To display a complete message made up of multiple message units, the message units stored in the memory 12 include at least one wherein a first predetermined binary coded signal occurs at a first predetermined character display signal location in memory indicating the end of the first message unit in a plurality of message units and that the immediately succeeding message address locations in memory contain the message units necessary to form the complete message. The end of the first message unit signal activates the sequencing means 20 to generate the required message address signals to select the succeeding message units from the memory 12 to be displayed by the visual display device. Additionally, the message units stored in the memory 12 comprising a multiple-message unit message include at least one message unit wherein a second predetermined binary coded signal occurs at a second predetermined character display signal location in memory of the last message unit in a multiple-message unit message to indicate the end of a complete message. The end of complete message signal disables the sequencing means 20 and permits a new message to be selected. In the preferred embodiment, the first and second predetermined binary coded signal representations are preferably displayed in the last character display location of the display device 10 and represent a comma and a period respectively. However, it is not necessary that the signals occur in a character display location but may be in a non-display location in memory associated with the respective multiple-message unit, for example, perhaps a seventeenth memory location.

Considering now in further detail the multiple message unit sequencing means 20 of FIG. 1. The sequencing means 20 comprises a BCD to binary decoder 30, a message unit address means 46, a multiple-message unit-/end of message sensing circuit means 48, a sequencing activation means 50, a clock steering logic circuit means 60 and a message unit clock pulsing means 52. Message unit address signals in the form of BCD data are carried on the multiple conductor line 28 from the real time signal means 14 to the corresponding message unit selection means or BCD to binary decoder 30 input terminals. Since the memory 12 requires a binary coded signal to access a memory location, the BCD formated message unit address signal is converted by the BCD to binary decoder 30 to a binary coded signal representative of the message unit address and is loaded into the message unit address means or asynchronous programmable binary counter 46 by means of a multiple conductor line 58. When the $\overline{\text{LOAD}}$ signal is present on lead 54 the counter is preset, that is, the output of the counter 46 will agree with the message unit address signal data present on the input line 58 upon the occurence of a clock pulse signal on lead 56. The necessary clock pulse signal is generated by the clock steering logic circuit means 60 when a SELECT MESSAGE signal is generated on line 35 by the real time signal means 14.

When the message unit selected from the memory 12 is one that is part of a multiple-message unit message, a COMMA signal present on lead 62 indicates that during the time of the sixteenth character location in the message unit the binary coded signal representative of a comma has been decoded. The sensing circuit means 48 is also activated during the time that the sixteenth character is displayed and in response to the detection of the COMMA signal produces an ENABLE signal on lead 64. The multiple-message unit logic circuit means 50 in response to the ENABLE signal generates a START multiple-message unit signal on lead 66 causing the message unit clock pulsing circuit 52 to produce clock pulse signals on lead 68 at a desired preset frequency. The clock pulse signals are fed to the clock steering circuit 60 which directs the clock pulse signals to the counter 46 on lead 56. The sequencing activation means 50 also produces during the time of a multiple-message unit message a signal on the LOAD lead 54 to enable the counter 46 to count up sequentially from the selected message unit address value that was loaded into the counter 46 to generate each next succeeding message address signal to select the corresponding next message unit of the multiple-message unit message from the memory 12. When the final message unit of a multiple-message unit message is displayed, a PERIOD signal present on lead 72 indicates that during the time of the sixteenth character location in the message unit a binary coded signal representative of a period has been decoded. The sensing circuit means 48 is activated during the time that the sixteenth character is displayed and in response to the detection of the PERIOD signal produces an END signal on lead 64. The sequencing activation means 50 in response to the END signal sends a STOP signal on lead 66 to the message unit clock pulsing circuit 52 to deactivate the clock circuit. The sequencing activation means 50 also generates a $\overline{\text{LOAD}}$ signal on lead 54 to disable the counter 46.

Figure 2:
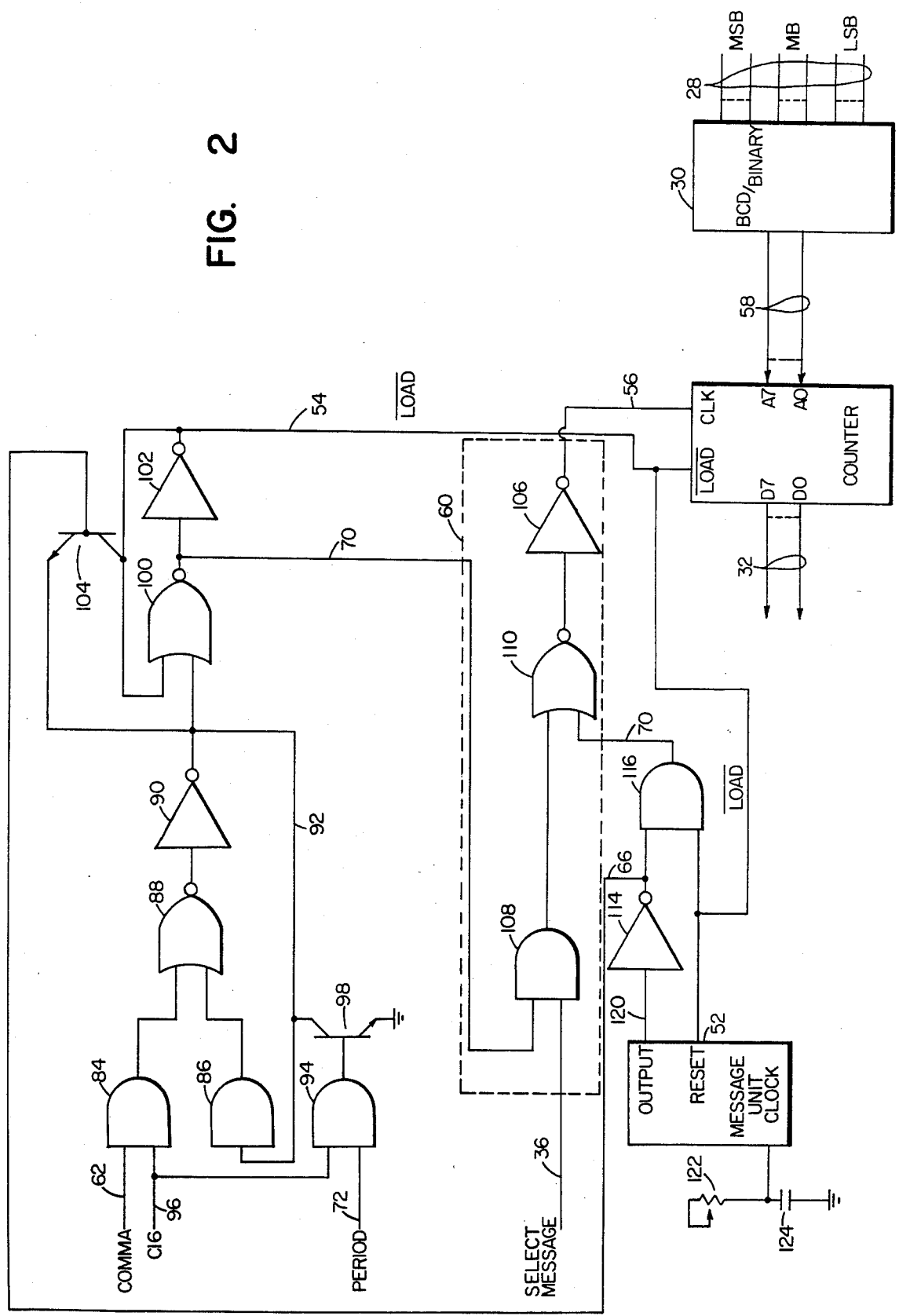
FIG. 2 shows partly in schematic form and partly in block diagram form the multiple-message unit sequencing means circuit of FIG. 1.

One preferred embodiment of the multiple-message unit sequencing means 20 of FIG. 1 is represented by the circuit schematic shown in FIG. 2. Referring now to FIG. 2, the message unit address signal is generated by the real time signal means as explained in the discussion of FIG. 1 above in BCD format and appears on the multiple conductor lead 28. Each decimal digit of the address number is represented by a four bit combination and is converted to a binary coded signal which is outputted to the multiple conductor line 32 as exlained above. By inspection it can be seen that the output of inverter 102 will remain low until a COMMA signal on line 62 and a character 16 (C16) signal on line 96 occur at the same time thereby keeping the LOAD signal on line 54 low and conditioning the counter 46 to throughput the binary coded message unit address signal upon the occurrence of a clock pulse on lead 56. A clock pulse signal is caused to occur when a SELECT MESSAGE signal appears on lead 35 which is fed to one input of an AND gate 108. Since the other input of AND gate 108 is connected to the output of the NOR gate 100 which is held high at this time, the output of gate 108 follows the input SELECT MESSAGE signal. The output of gate 108 is connected to one input of a NOR gate 110. The output of the NOR gate 110 drives inverter 106 to produce a clock pulse signal on lead 56 to cause the counter 46 output data at terminals D0-D7 and multiple conductor lead 32 to agree with the input message address data on terminals A0-A7 connected to the multiple conductor lead 58.

When the message unit address selected is a multiple-message unit message, a COMMA signal on lead 62 occurs at the same time as a C16 signal on lead 96 and causes the output of AND gate 84 to go high. The output of gate 84 is connected to one input of NOR gate 88 and a high signal at the output of gate 84 causes the output signal of NOR gate 88 to go low. The output signal of gate 88 is inverted by inverter 90, the inverter output being connected via the lead 92 to the input of gate 86 causing the output signal of gate 86 to go high. The output of gate 86 is connected to the other input of NOR gate 88 forcing the output signal of inverter 90 to latch high. The output of inverter 90 is also connected to one input of a NOR gate 100 forcing the output signal of gate 100 low and the output signal of inverter 102 high. The output signal of inverter 102 latches high since its output is fed back on the lead 54 to the other input of the NOR gate 100.

When the output signal of inverter 102 is high and consequently the $\overline{\text{LOAD}}$ signal on lead 54 is high, the counter 46 is conditioned to count up from the preset binary coded message unit address appearing at the input terminals A0-A7 until the LOAD signal on lead 54 returns to a low state. The binary coded message address at the output D0-D7 of counter 46 is incremented each time a clock pulse signal appears on lead 56. The message unit clock pulsing circuit 52 comprises a conventional 555 type integrated circuit timer and is enabled when the $\overline{\text{LOAD}}$ signal is high causing the circuit to produce clock pulse signals on a lead 120 connected to an inverter 114. The inverted clock pulses from inverter 114 are fed on lead 66 to one input of an AND gate 116, the other input to AND gate 116 being held high by the $\overline{\text{LOAD}}$ signal on lead 54. The output of AND gate 116 is connected via the lead 70 to the other input of the clock steering circuit 60 comprising the AND gate 108, NOR gate 110 and inverter 106. The output signal of the NOR gate 110 follows the clock pulse signal of the message unit clock pulsing circuit 52 and clocks the counter 46 through inverter 106. A new message unit address is produced for each clock pulse generated and the corresponding message unit is selected from memory and displayed in a time-spaced relationship from the previously displayed message unit on the display device 10. When the last message unit in a multiple-message unit message is displayed, a PERIOD signal on lead 72 occurs at the same time as a C16 signal on lead 96 and causes the AND gate 94 output signal to go high turning on transistor 98 which connects by the lead 92 the output of inverter 90, the emitter of transistor 104, one input of NOR gate 100 and the input to gate 86 to ground and unlatches the logic loop comprising gates 86, 88 and 90. The other input to the NOR gate 100 is forced low when transistor 104 is caused to conduct by the inverter 114 output going high at the next clock pulse. The one clock pulse delay is necessary to allow time for the last message unit to be selected from memory and displayed prior to unlatching the logic loop comprising gates 100 and 102. The inverter 102 output provides a low $\overline{\text{LOAD}}$ signal on lead 54 disabling counter 46 and resetting the message unit clock pulsing circuit 52. The multiple-message unit sequencing circuit 20 is again in a condition to receive a new message unit selection address from the real time means via the multiple conductor lead 28.

The sequencing speed regulating the display time interval of message units in a multiple-message unit message is controllable over a range of 20 to 60 message units per minute in the preferred embodiment by adjusting variable resistance 122. A different desired sequencing speed range may be obtained by selecting the appropriate timing components resistance 122 and capacitor 124 for the message unit clock pulsing circuit 52.

Considering now in further detail the reserve digit real time signal means 18 of FIG. 1. The reserve digit signal means 18 comprises a reserve digit decoder 74, a reserve digit latch 76 and a reserve character select logic circuit means 78. As stated above, to display real time data when the selected message unit is one having a stored message component and a real time message component, it is necessary to reserve either three or six digits in accordance with the number of character display locations required to display the real time data. The number of character locations to be reserved is predetermined by the user. For example, the message unit may perhaps indicate the rpm of a rotating member at a given location in a mechanism being monitored and the user knows the magnitude of the rpm can always be displayed in the space of three character locations. Consequently only three character locations need be reserved. Therefore, when the characters comprising the message unit are coded for storage in the character locations in memory, the user inserts a predetermined binary coded signal in the character display signal position immediately preceeding the number of character display locations to be reserved, that is, if character locations 14 through 16 are to be reserved then the predetermined binary coded signal is inserted at character location 13 (C13) in the memory and likewise, if character locations 11 through 16 are to be reserved the predetermined binary coded signal is inserted at character location 10 (C10). The reserve digit decoder 74 senses the output from memory 12 on the multiple conductor line 82 which carries the binary coded signals D0–D7 representing the six bit alphanumeric code and the two bit punctuation code. The reserve digit decoder generates a LOOK signal on lead 80 in response to sensing the predetermined binary coded signal and activates the reserve digit latch 76. A reserve signal is produced on lead 84 when the LOOK signal occurs at the same time that the C10 or C13 signal occurs. In the preferred embodiment, the predetermined binary coded reserve signal represents an EQUAL sign. The reserve digit signal on lead 84 is fed to a reserve character select logic circuit means 78 which generates a RDRT signal on lead 126 to disable the tri-state buffer message latch 34 so that signals representing real time data appearing on the multi-conductor line 28 are not read as message unit address signals but are routed to the tri-state buffer real time data latch 36 to be read as real time data. The outputs RC11–RC16 of the reserve character select logic circuit means 78 on the multi-conductor line 44 enable the data latch 36 to transmit the real time BCD data to the memory 12 on the multi-conductor line 38 one character at a time to be decoded by memory 12 for transmission to the display bus 26. It will be understood that the enable signals generated by the reserve character select logic circuit means 78 will correspond to the respective character location selected, that is, for example, character location 11 would be selected during the occurence of enable signal RC11.

Figure 3:
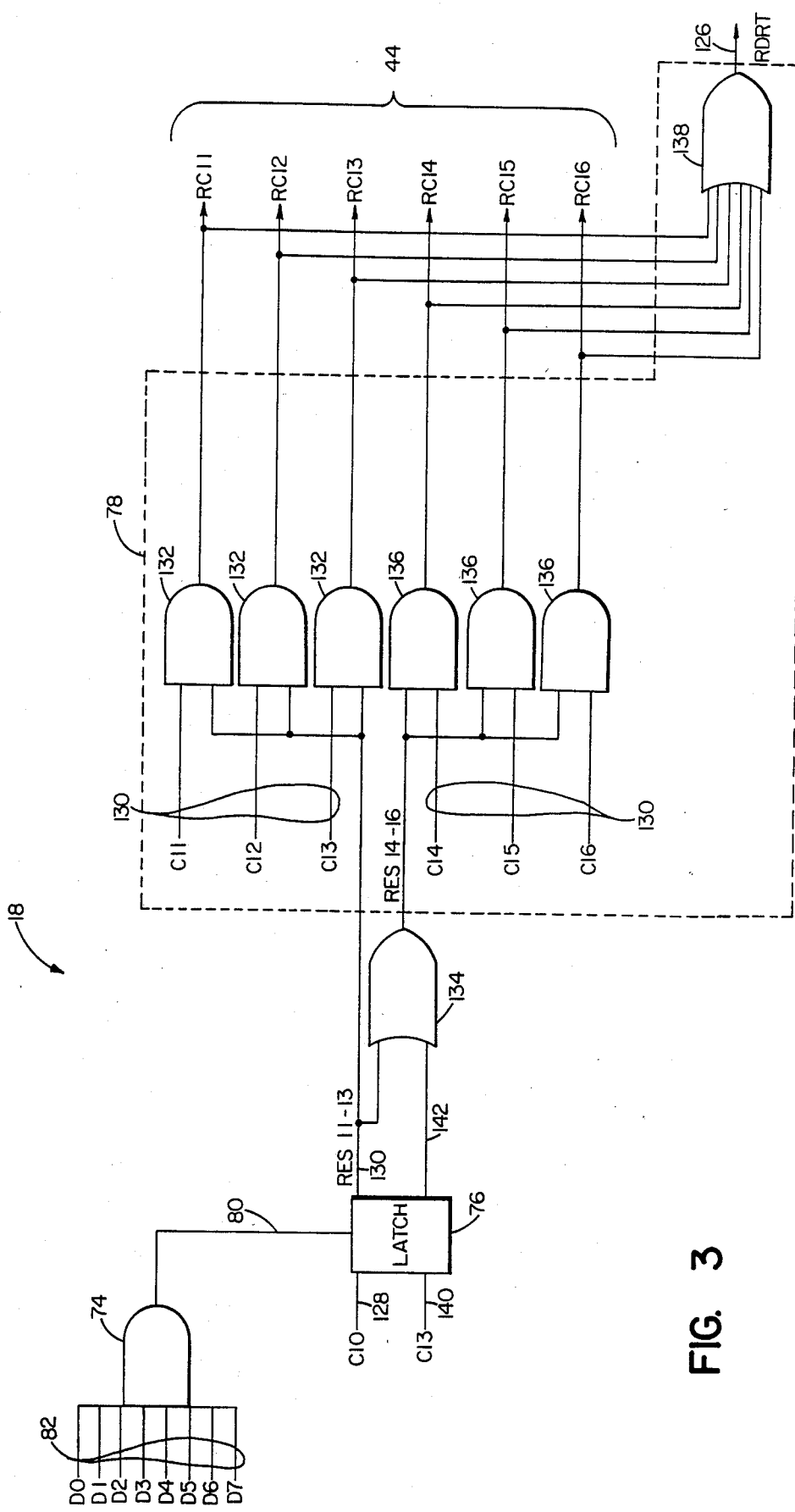
FIG. 3 shows in schematic form the reserve digit real time signal means circuit of FIG. 1.

A preferred embodiment of the reserve digit signal means 18 of FIG. 1 is represented by the circuit schematic shown in FIG. 3. Referring now to FIG. 3, the binary coded reserve digit signal in the form of a hexidecimal binary coded signal is transmitted from the memory in the same manner as shown above in FIG. 1 on the multiple conductor lead 82 to an AND gate 74. When the proper signal levels representing an EQUAL sign are present, the AND gate 74 generates a high signal on lead 80 to enable the reserve digit latch 76. When a C10 signal occurs on lead 128 at the same time that the EQUAL sign signal occurs, character locations 11–16 are reserved as described by the following. A high signal is outputted by the digit latch 76 on lead 130 which is connected to one input of each AND gate 132, and to one input of an OR gate 134. The output of OR gate 134 is connected to one input of each AND gate 136. The output logic signal of the OR gate 134 is high when the signal on lead 130 is high. The AND gates 132, 136 of the reserve character select logic circuit 78 are now conditioned to generate output enable signals RC11–RC16 on the multiple conductor lead 44 when the corresponding character location select signals C11–C16 occur on the multiple conductor lead 130. The enable signals RC11–RC16 are also connected to an OR circuit means 138 to generate the RDRT signal on lead 126 whenever any one of the RC11–RC16 signals are high. In a similar manner, character locations 14–16 are reserved when a C13 signal occurs on lead 140 at the same time that the EQUAL sign signal occurs on lead 80 causing digit latch 76 to output a high signal on lead 142 which is connected to the other input of OR gate 134. In this instance only the AND gates 136 are conditioned to generate the output enable logic signals on RC14–RC16 when the corresponding character location select logic signals C14–C16 occur. The OR circuit means 138 will produce an RDRT signal on lead 126 whenever any one of the RC14–RC16 signals are high.

The character location logic signals C1–C16 on the multiple conductor lead 130 are generated by the master clock means 16 of FIG. 1.

Apparatus for expanding the display capacity of an alphanumeric unitary visual display system having a limited number of character display locations by sequencing a plurality of message units to form multiple-message unit messages has been described in a preferred embodiment and numerous substitutions and modifications can be had without departing from the spirit of the invention. Accordingly, the present invention has been described merely by way of illustration rather than limitation.

I claim:

1. An alphanumeric visual display system for displaying a preprogrammed message made up of a number of complete message units in a sequence, said system comprising:

a unitary visual display device having a limited number of character stations at each of which any one of a multiple of characters may be displayed by the application thereto of a set of binary coded signals;

memory means for storing a plurality of complete message units, each of said complete message units including a plurality of characters not greater in number than the number of character stations of said display device and having binary coded signals representative of each character to be displayed at each of the number of character station locations stored at corresponding character locations in said memory means, said complete message units forming a plurality of complete messages and at least one of the complete messages is made up of a number of the complete message units in sequence;

sequencing means for causing each of said complete message units of a complete message to be displayed by said visual display device in a time-spaced relationship one complete message unit at a time;

first signal means for indicating the first complete message unit in a sequence of complete message units in a complete message, each of said complete message units having one predetermined character location in said memory for storing a first binary coded signal representative of said first signal means;

first sensing means for sensing said first signal means, and means responsive to the sensing of said first signal means for activating said sequencing means.

2. An alphanumeric display system as set forth in claim 1 wherein said sequencing means comprises:

message unit selection means for selectively providing a complete message unit address signal, each of said complete message units having an associated identifying address;

message unit address means for receiving said complete message unit address signals from said message unit selection means and for transferring said address signal to said memory means in response to a SELECT MESSAGE signal for selecting said complete message units therefrom;

message unit clock pulsing means for producing clock pulse signals in response to a START signal from said sequencing activation means, and said sequencing activation means including means for producing a signal to condition said message unit address means to count up sequentially from said received message unit address in response to said clock pulse signals, each succeeding count being a different message unit address signal representative of the next complete message unit in a sequence of complete message units comprising a said complete message.

3. An alphanumeric display system as set forth in claim 1 wherein said character location in memory for storing said first binary coded signal is associated with and comprises a character display station in an N character capacity display device wherein N represents the maximum number of character display stations of the display device and said location in memory for storing said first binary coded signal is associated with and comprises the Nth character display station.

4. An alphanumeric display system as set forth in claim 3 wherein said first sensing means comprises a first logic circuit means for detecting the presence of said first binary coded signal in the Nth character location during the display of a complete message unit containing said first signal in said Nth character location.

5. An alphanumeric display system as set forth in claim 2 further comprising:

second signal means for indicating the last complete message unit in a sequence of complete message units in a complete message, each of said complete message units having a second predetermined character location in said memory for storing a second binary coded signal representative of said second signal means;

second sensing means for sensing said second signal means, and means responsive to the sensing of said second signal means for deactivating said sequencing means and for enabling said message unit selection means to select a new message.

6. An alphanumeric display system as set forth in claim 5 wherein said predetermined character location in memory for storing said second binary coded signal is associated with and comprises a character display station in an N character capacity display device wherein N represents the maximum number of character display stations of the display device and said location in memory for storing said second binary coded signal is associated with and comprises the Nth character display station.

7. An alphanumeric display system as set forth in claim 6 wherein said second sensing means comprises a second logic circuit means for detecting the presence of said second binary coded signal in the Nth character location during the display of a complete message unit containing said second signal in said Nth character location.

8. An alphanumeric visual display system for displaying a preprogrammed message made up of a number of complete message units in a sequence, said system comprising:

a unitary visual display device having a limited number of character stations at each of which any one of a multiple of characters may be displayed by the application thereto of a set of binary coded signals;

memory means for storing a plurality of complete message units, each of said complete message units including a plurality of characters not greater in number than the number of character stations of said display device and having binary coded signals representative of each character to be displayed at each of the number of character station locations stored at corresponding character locations in said memory means, said complete message units forming a plurality of complete messages and at least one of the complete messages is made up of a number of complete message units in sequence and at least one of the complete message units is a combination message unit made up of a stored message component and a real time message component, said stored message component having a number of characters which number is less than the number of said character stations of the display device;

sequencing means for causing each of said complete message units of a complete message to be displayed by said visual display device in a time-spaced relationship one complete message unit at a time;

first signal means for indicating the first complete message unit in a sequence of complete message units in a complete message, each of said complete message units having one predetermined character location in said memory for storing a first binary coded signal representative of said first signal means;

first sensing means for sensing said first signal means;

means responsive to the sensing of said first signal means for activating said sequencing means;

real time signal means associated with at least one real time condition and providing at least one real time message component varying in time with variations in the value of its corresponding real time condition so as to represent at any given instant the instantaneous value of said corresponding condition;

reserve digit signal means for indicating that a complete message unit is a combination message unit having a stored message component and a real time message component, each said combination message unit having one predetermined character location in said memory for storing a predetermined binary coded signal representative of said reserve digit signal means;

sensing means for sensing said reserve digit signal means in a said combination message unit, and means responsive to the sensing of said reserve signal means for reserving a plurality of character display stations for displaying in a combination message unit at the reserved character stations a corresponding number of characters comprising a said real time message component.

9. An alphanumeric display system as set forth in claim 8 wherein said predetermined character location in memory for storing said reserve digit binary coded signal comprises the character location immediately preceding the character location associated with the first character station of the number of reserved character stations.

10. An alphanumeric display system as set forth in claim 9 wherein said reserve signal sensing means comprises decoding circuit means for detecting the presence of said predetermined binary coded reserve signal in the predetermined character location during the display of a combination message unit containing said predetermined binary coded reserve signal in the predetermined character location.

11. An alphanumeric display system as set forth in claim 10 wherein said responsive means comprises a reserve character select logic circuit means for enabling each character of a real time message component one character at a time for display in its respective associated reserved character station whereby the stored message component and the real time message component are displayed simultaneously as one complete message unit.

12. An alphanumeric visual display system for displaying a preprogrammed message made up of a number of complete message units in a sequence, said system comprising:

a unitary visual display device having a limited number of character stations at each of which stations any one of a multiple of characters may be displayed by the application thereto of a set of binary coded signals;

memory means for storing a plurality of complete message units, each of said complete message units including a plurality of characters not greater in number than the number of character stations of said display device and having binary coded signals representative of each character to be displayed at each of the number of character station locations stored at corresponding character locations in said memory means, said complete message units forming a plurality of complete messages and at least one of the complete messages is made up of a number of said complete message units in sequence and at least one of the complete message units is a combination message unit, said combination message unit being made up of a stored message component and a real time message component, said stored message component having a number of characters which number is less than the number of said character stations of the display device;

real time signal means associated with at least one real time condition and providing at least one real time message component consisting of at least one character and varying in time with variations in the value of its corresponding real time condition so as to represent at any given instant the instantaneous value of said corresponding condition;

sequencing means for causing each of said complete message units of a complete message to be displayed by said visual display in a time-spaced relationship one complete message unit at a time;

first signal means for indicating the first complete message unit in a sequence of complete message units in a complete message, each of said complete message units having one predetermined character location in said memory for storing a binary coded signal representative of said first signal means;

second signal means for indicating the last complete message unit in a sequence of complete message units in a complete message, each of said complete message units having a second predetermined character location in said memory for storing a second binary coded signal representative of said second signal means;

first sensing means for sensing the presence of said first signal means in said one predetermined character location of a complete message unit;

first responsive means responsive to the sensing of said first signal means for activating said sequencing means;

second sensing means for sensing the presence of said second signal means in said second predetermined character location of a complete message unit;

second responsive means responsive to the sensing of said second signal means for deactivating said sequencing means;

third signal means for indicating a complete message unit is a combination message unit having a stored message component and a real time message component, each of said combination message units having a third predetermined character location in said memory for storing a binary coded signal representative of said third signal means;

third sensing means for sensing the presence of said third signal means in said third predetermined character location of a combination message unit; and third responsive means responsive to the sensing of said third signal means for reserving a plurality of character display stations in a combination message unit to display at the reserved character stations a corresponding number of characters comprising a said real time message component.

13. An alphanumeric visual display system for displaying a preprogrammed message made up of a number of complete message units in a sequence, said system comprising:

a unitary visual display device having a limited number of character stations at each of which any one of a multiple of characters may be displayed by the application thereto of a set of binary coded signals;

memory means for storing a plurality of complete message units, each of said complete message units including a plurality of characters not greater in number than the number of character stations of said display device and having binary coded signals representative of each character to be displayed at each of the number of character station locations stored at corresponding character locations in said memory means, said complete message units forming a plurality of complete messages and at least one of the complete message units is a combination message unit made up of a stored message component and a real time message component, said stored message component having a number of characters which number is less than the number of said character stations of the display device;

sequencing means for causing each of said complete message units of a complete message to be displayed by said visual display device in a time-spaced relationship one complete message unit at a time;

first signal means for indicating the first complete message unit in a sequence of complete message units in a complete message, each of said complete message units having one predetermined character location in said memory for storing a first binary coded signal representative of said first signal means;

first sensing means for sensing said first signal means;

means responsive to the sensing of said first signal means for activating said sequencing means;

real time signal means associated with at least one real time condition and providing at least one real time message component varying in time with variations in the value of its corresponding real time condition so as to represent at any given instant the instantaneous value of said corresponding condition;

reserve digit signal means for indicating that a complete message unit is a combination message unit having a stored message component and a real time message component, each said combination message unit having one predetermined character location in said memory for storing a predetermined binary coded signal representative of said reserve digit signal means;

sensing means for sensing said reserve digit signal means in a said combination message unit;

means responsive to the sensing of said reserve signal means for reserving a plurality of character display stations for displaying in a combination message unit at the reserved character stations a corresponding number of characters comprising a said real time message component, and said predetermined character location in memory for storing said reserve digit binary coded signal comprising the character location immediately preceding the character location associated with the first character station of the number of reserved character stations.

14. An alphanumeric display system as set forth in claim 13 wherein said reserve signal sensing means comprises decoding circuit means for detecting the presence of said predetermined binary coded reserve signal in the predetermined character location during the display of a combination message unit containing said predetermined binary coded reserve signal in the predetermined character location.

15. An alphanumeric display system as set forth in claim 14 wherein said responsive means comprises a reserve character select logic circuit means for enabling each character of a real time message component one character at a time for display in its respective associated reserved character station whereby the stored message component and the real time message component are displayed simultaneously as one complete message unit.

* * * * *